United States Patent [19]

McKee et al.

[11] Patent Number: 4,527,444
[45] Date of Patent: Jul. 9, 1985

[54] TILT-TELESCOPE STEERING WHEEL ARRANGEMENT

[75] Inventors: Kenneth E. McKee, Chicago; Harold G. Meitl, Darien; Vo V. Thanh, Willowbrook; Craig A. Bixler, Woodridge, all of Ill.

[73] Assignee: J. I. Case Company, Racine, Wis.

[21] Appl. No.: 423,507

[22] Filed: Sep. 27, 1982

[30] Foreign Application Priority Data

Jul. 21, 1982 [WO] PCT Int'l Appl. ........ U.S. 82/00984

[51] Int. Cl.³ .................... B62D 1/18; B62D 1/20; G05G 5/24
[52] U.S. Cl. ........................ 74/493; 74/478; 74/484 R; 74/498; 74/540; 180/90; 280/775
[58] Field of Search ............ 74/478, 484 R, 493, 74/498, 540, 542; 180/90; 280/775

[56] References Cited

U.S. PATENT DOCUMENTS

| 2,903,904 | 9/1959 | Mackie | 74/493 |
| 3,199,625 | 8/1965 | Liebreich | 74/493 |
| 3,412,629 | 11/1968 | Hill | 74/493 |
| 3,548,128 | 12/1970 | Willett | 74/493 |
| 3,799,569 | 3/1974 | Baker | 74/493 |
| 4,429,588 | 2/1984 | Emundts et al. | 74/484 R |

FOREIGN PATENT DOCUMENTS

| EP15705 | 9/1980 | European Pat. Off. | 74/493 |
| 54-20531 | 2/1979 | Japan | 74/484 H |

Primary Examiner—Allan D. Herrmann
Attorney, Agent, or Firm—Dressler, Goldsmith, Shore, Sutker & Milnamow, Ltd.

[57] ABSTRACT

A tilt and telescope steering wheel with a push button keyboard non-rotatably mounted within the steering wheel has a foot actuated release mechanism for simultaneous disengagement of tilt lock and telescope lock mechanisms. A readout instrument panel with various indicators thereon rigidly attached to and tiltable with the steering column so as to provide a constant angular correlation with the steering wheel facilitating an unobstructed view of the panel in all steering wheel tilt positions.

15 Claims, 5 Drawing Figures

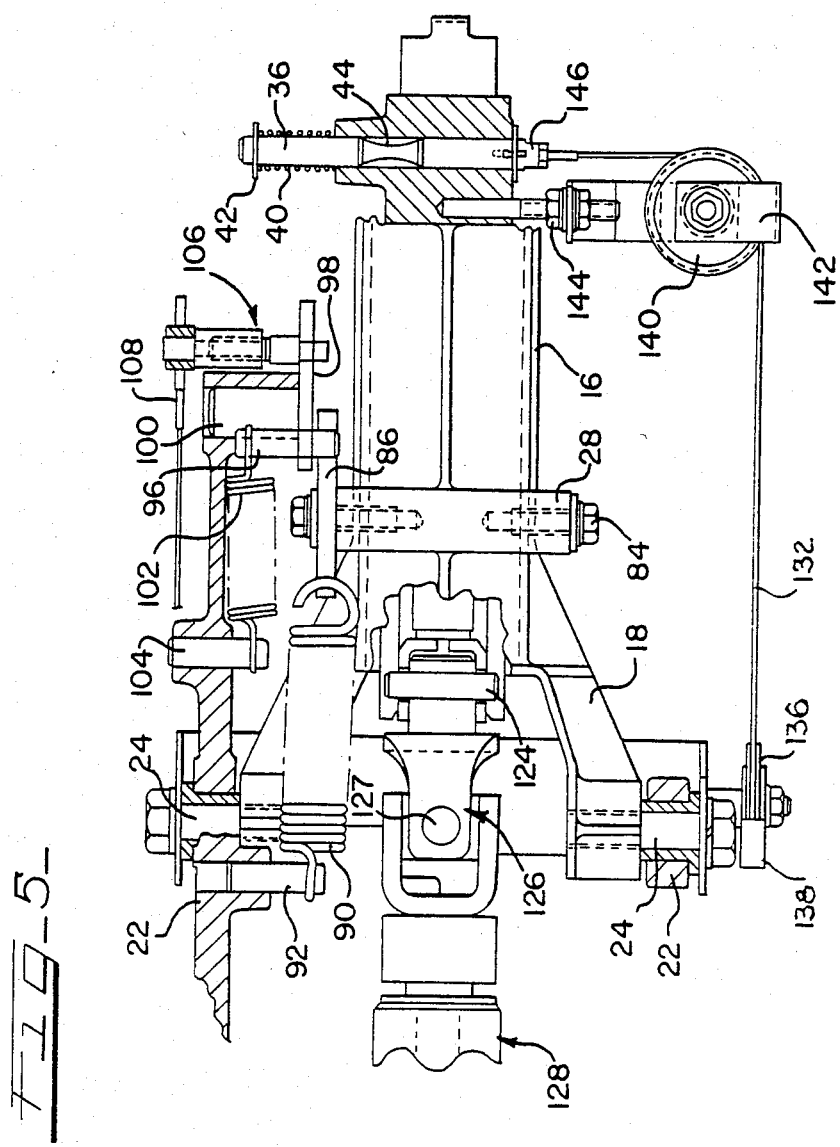

TILT-TELESCOPE STEERING WHEEL ARRANGEMENT

BACKGROUND OF THE INVENTION

1. Field of the Invention

This invention pertains to motor vehicle steering wheel arrangements and more particularly to a steering wheel being able to tilt and telescope.

2. Description of the Prior Art

Heretofore, tilt and telescope steering wheels have utilized a hand-actuated lever mounted on a steering column. Prior art arrangements utilized plurality of levers to carry out tilt and telescope operations. Conventional push button controls, as well as vehicle function indicators are dispersed on the dashboards. Most of the indicators are out of the operator's line of sight. Having the control buttons spread around the instrument panel usually requires elaborate wiring harness and time consumption.

The Applicants do not know any prior art references or arrangements which would suggest, teach or illustrate the novel tilt and telescope steering wheel design having a keyboard mounted within the boundries of the steering wheel, a readout instrument panel providing an unobstructed veiw thereof in all steering wheel tilt positions, and other features which are described in detail in the below disclosed subject invention.

SUMMARY OF THE INVENTION

According to the present invention, a motor vehicle tilt and telescope steering wheel arrangement comprises a steering wheel rotatably mounted on a slanted steering column. The steering column comprises tilt means and a tilt lock mechanism therefor. The steering column also includes a steering wheel telescope means and a telescope lock mechanism therefor being independent of the tilt lock mechanism. A lock release mechanism interconnects the tilt lock and telescope lock mechanisms for simultaneous disengagement thereof in response to an operator's one-step actuation.

BRIEF DESCRIPTION OF THE DRAWINGS

FIG. 5 is a top view taken substantially along the lines 5—5 in FIG. 4.

DESCRIPTION OF THE PREFERRED EMBODIMENT

Figure 1:
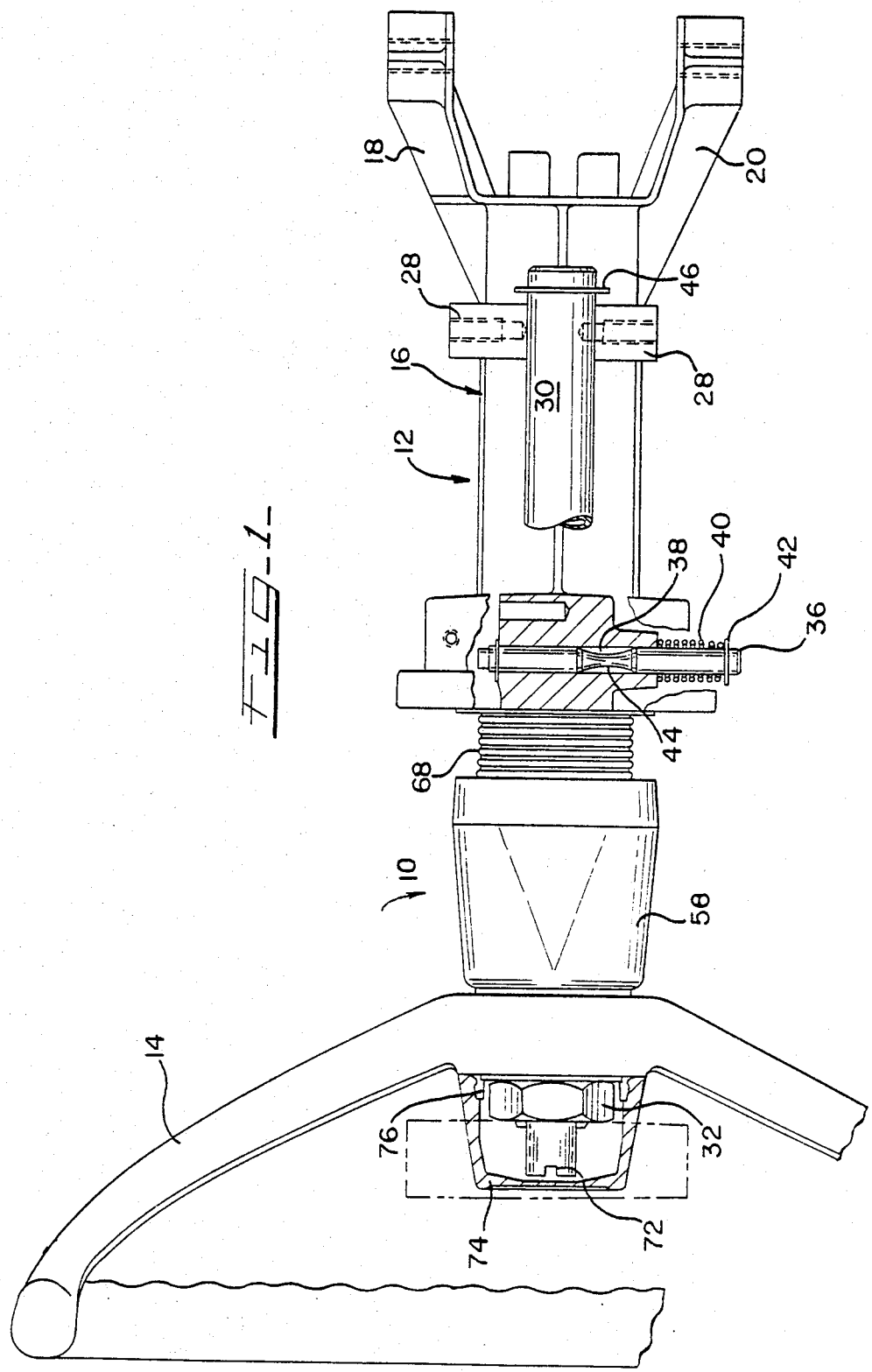
FIG. 1 is a top fragmentary view of an upper portion of a steering wheel arrangement showing telescope mechanism.

The invention may be carried into practice in a number of ways but one specific embodiment will be described by way of example only.

Referring now to the drawings wherein reference characters designate like or corresponding parts throughout the several views, it is shown in FIGS. 1-5, a tilt and telescope steering wheel arrangement 10. The arrangement 10 described in the instant invention can be applied to any motor vehicle having steering means, but for purposes of illustration the hereinbelow arrangement is applied to an agricultural tractor.

As best shown in FIG. 1, a steering column 12 supports a steering wheel 14. A steering column frame or casing 16 forms a structural support for the steering column 12 and comprises pivot legs 18 and 20. The frame 16 is pivotally mounted on a support base 22, shown in FIGS. 3 and 4, rigidly attached to the vehicle body. The pivot legs 18 and 20 are pivotally supported by pins 24 extending inwardly from the support base 22, as best shown in FIG. 5. Locating bosses 28 are symmetrically disposed on the steering column frame 16 and perform a plurality of functions which will be described below.

Figure 2:
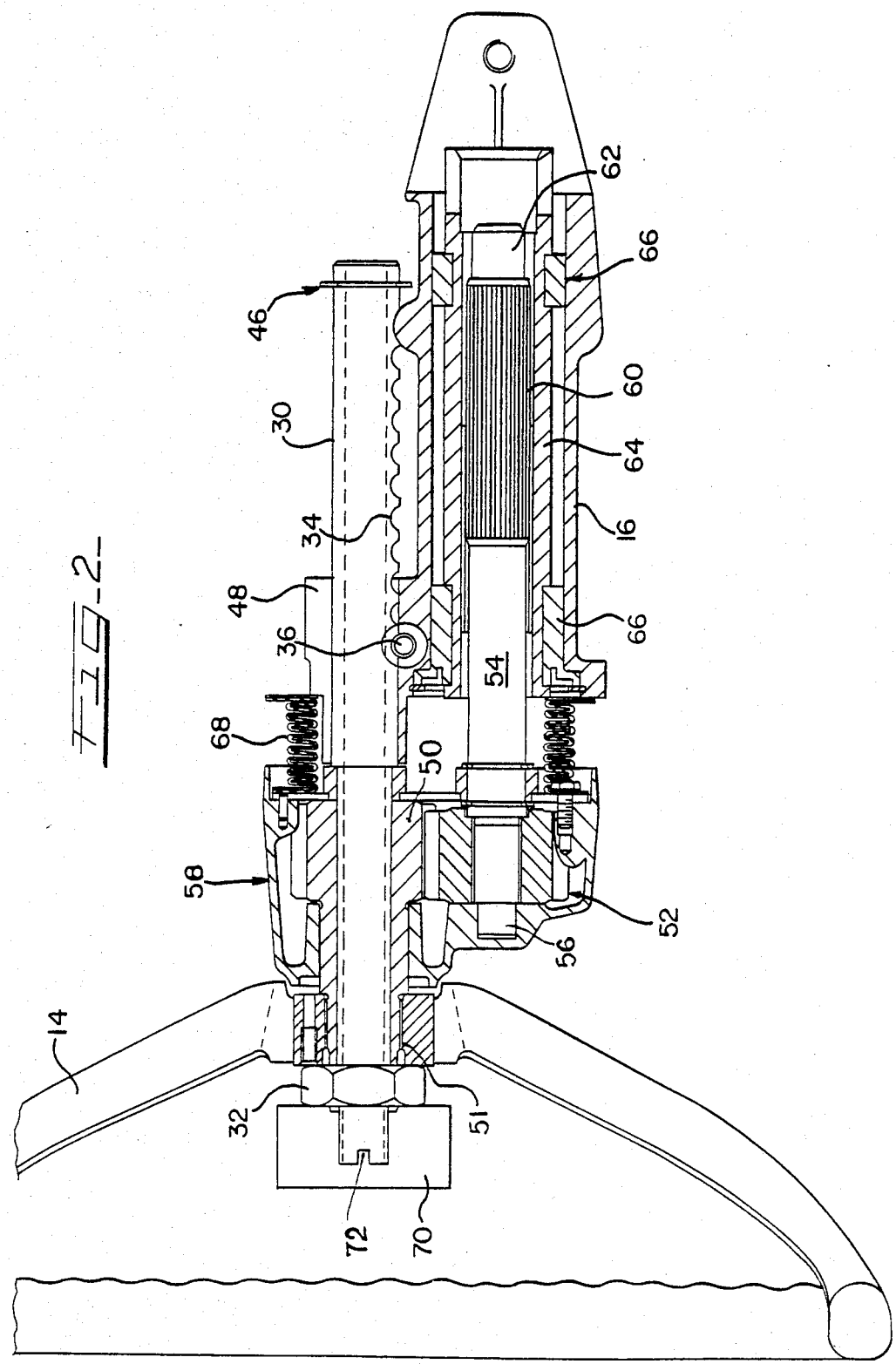
FIG. 2 is a fragmentary side view of the upper portion of the steering wheel arrangement.

The steering wheel 14 is rotatably mounted on and telescoping with a non-rotatable quill shaft 30 passing through the steering column 12. The steering wheel 14 upward displacement is limited by a lock nut 32, which does not inhibit or arrest the rotational movement of the wheel 14. The quill shaft 30 has an undulated surface in its lowermost section formed by a plurality of recesses 34, better shown in FIG. 2. The lock pin 36 reciprocally moveable within the bore 38 of the column frame 16 is urged by a compression spring 40 to move into one of said recesses 34 for lockable engagement of the quill shaft 30 with the column frame 16. This engagement prevents further longitudinal or telescoping displacement of both the quill shaft 30 and steering wheel 14 along the steering column 12. The spring 40 is retained at the end of the pin 36 by a retaining ring 42. The lock pin 36 comprises an annular groove portion 44 clearing the quill shaft travel path in an unlocked position. As shown in FIG. 2, the quill shaft 30 longitudinal travel is limited by a retaining ring 46 at the end of the quill shaft 30, resting against the column frame shoulder 48 in its uppermost position.

A steering drive gear 50 is rotatable on and supported by the quill shaft 30 is splined with the steering wheel 14 at 51 for transmitting a steering torque therefrom. A driven gear 52 meshing with the drive gear 50 is rigidly mounted on a steering shaft 54. The shaft 54 has its first end 56 journalled in the gear housing 58 and has splines 60 in its second end 62. The steering shaft 54 is enclosed and supported by a telescope steering tube 64 through the plastic bushings 66. The steering column bellows 68 between the steering gear housing 58 and steering column frame 16 protect enclosed therein quill shaft 30 and steering shaft 54 from dust and a foreign matter entry. The steering torque is transmitted from the shaft 54 to the tube 64 through the splines 60 and thereafter to the vehicle steering system.

A push button control and analysis keyboard 70 is provided in the center of the steering wheel 14 for fast and easy access to and unobstructed view of the keyboard 70. The push button indicators on the keyboard 70 activate the tractor function analysis displays which can be located on the panel 78 or the keyboard 70. The keyboard 70 remains stationary during the steering wheel 14 rotation. This nonrotatable arrangement of the keyboard 70 is made possible by mounting it on a non-rotatable quill shaft 30. A recess 72 is the top portion of the quill shaft 30 is adapted to receive a clamp in the keyboard 70 for detachable connection thereto. The keyboard 70 is connected with corresponding vehicle function sources by virtue of electrical conduits passing through the steering column 12 and which are free from twisting and application of electrical contact slip rings. If the functions control and analysis keyboard is not utilized on a tractor, for instance when it is equipped with analog gauges, then a cover 74 may be attached to the steering wheel 14 by virtue of clamps 76.

Figure 3:
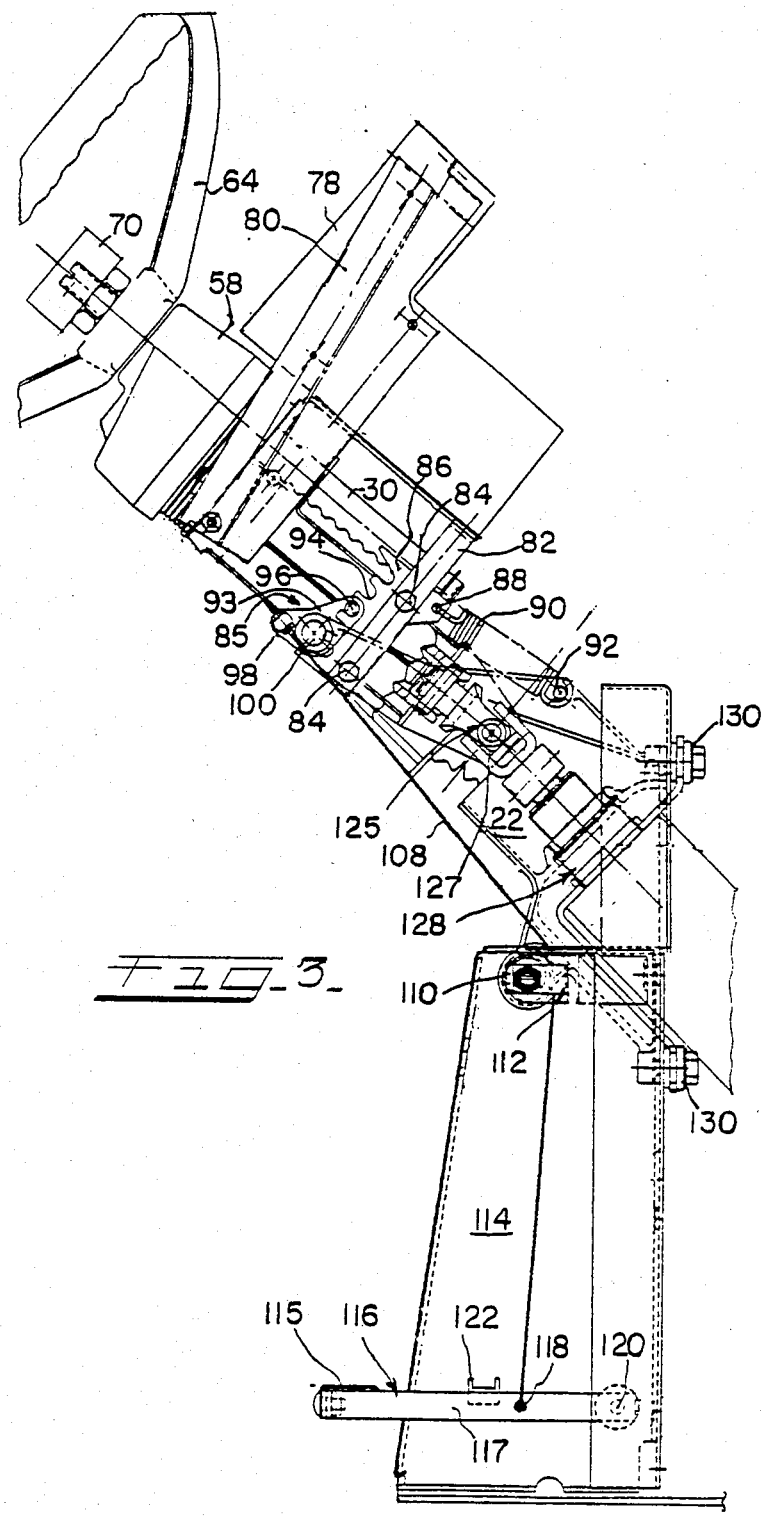
FIG. 3 is a side elevational view of the steering column illustrating the tilt lock mechanism.

As shown in FIG. 3, an instrument panel, indicated in its entirety by a numeral 78, includes display indicators, rate readouts and other functional readouts (not shown). The panel 78 is mounted on a frame 80 comprising support brackets 82 attached by the screws 84 to the bosses 28. Thus, the readout instrument assembly panel 78 is rigidly secured to the steering column 12 and simultaneously tiltable therewith. Rigid fixation of the panel 78 to the column frame 16 provides a constant angular correlation between the panel 78 and the steering wheel 14 resulting in unobstructed view of the panel regardless of the steering wheel tilt position.

The steering column 12 rotatable on its legs 18 and 20 has a tilt lock mechanism 85. The tilt lock mechanism 85 comprises a detent plate 86, which is also secured to the frame bosses 28 by the screws 84. The detent plate 86 has an opening 88 through which a counterbalance spring 90 is hooked thereto and another end of the spring 90 is hooked on a stud 92 projecting outwardly from the frame 16. It must be understood that there can be a plurality of counterbalance springs 90 or similar means counterbalancing the weight of steering column and wheel in the unlocked position. The detent plate 86 includes recesses or notches 94 adapted to receive a detent pin 96 integral with a projecting outwardly from a bell crank lever 98. The lever 98 is mounted on a pin 100 projecting inwardly from the support base 22. A tilt lock return spring 102 is hooked to the detent pin 96 at one end and its other end to a peg 104 extending inwardly from the support base 22, as shown in FIG. 5. The bell crank lever 98 is also attached through a pin-socket joint 106 to an actuating cabe 108. The cable 108 is guided by a pulley 110 supported by a bracket 112 extending from the vehicle firewall 114. Another end of the cable 108 is attached to a pedal actuator 116 by its eye-hook tip at the bolt joint 118. The pedal actuator 116 is accessible to either foot and can be a single or two pedal arrangement. In the instant embodiment it is a single pedal having two pivot arms, 117 and 117a, interconnected by a lateral bar 119. The pivot arms 117, 117a rotate about their pivot joints 120 on either side of the firewall 114. The upward movement of the pedal actuator 116, urged by a detent return spring 102, is limited by a stop 122 reacting against the pivot arm 117. Such a foot operated arrangement permits utilization of both hands for steering wheel tilting and telescoping operations.

As indicated above, the steering torque transmittal from the steering tube 64 to the vehicle steering system is carried out by virtue of a torque pin 124 projecting through the tube 64 and a part of the universal joint 126, as best shown in FIG. 3. The universal joint pivotal axis is the axis, indicated by a numeral 127, about which the steering column 12 and frame 16 rotate in all tilt positions. There are provided five tilt detent positions. Obviously this number can be changed. A middle position in a third recess is shown in FIG. 3. From the universal joint 126 the steering torque is transmitted to a steering hand pump 128 attached to the support base 22. The base is secured to the firewall 114 by bolts 130. The steering hand pump 128 is connected with the vehicle hydraulic steering system implementing the steering wheel guidance.

Figure 4:
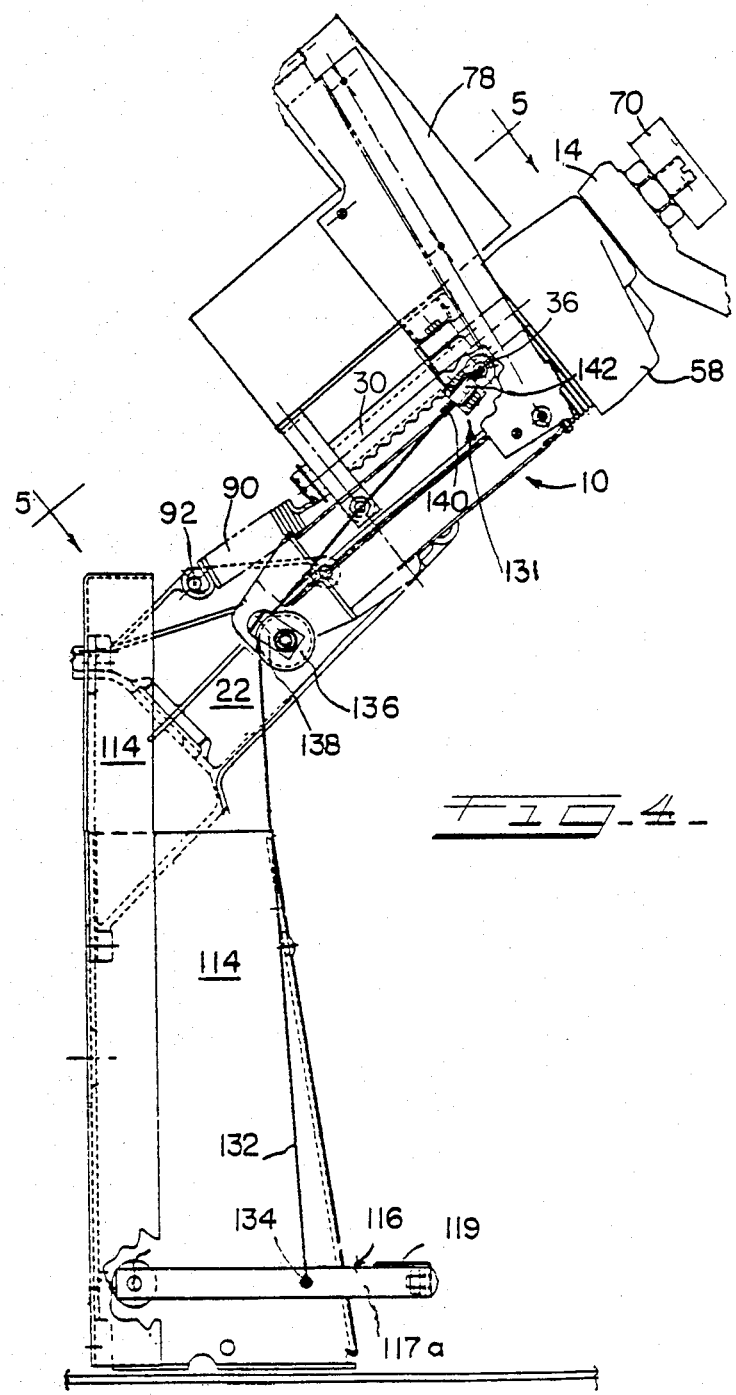
FIG. 4 is an opposite side view of the steering wheel arrangement illustrating telescope lock mechanism.

The telescope lock mechanism 131 is best illustrated in FIG. 4. An actuating cable 132, attached to the pivot arm 117a at a cable joint 134, is guided by a lower pulley 136. The pulley 136 is supported by a bracket 138 extending from the support base 22. The cable 132 is further guided by an upper pulley 140 which is supported by a bracket 142 mounted on a support bracket pin assembly 144, as shown in FIG. 5. The upper end of the cable 132 is attached to another end 146 of the lock pin 36. Thus upon depression of the pedal actuator 116 the cable 132 pulls the pin 36 into its unlocked position.

In operation, a vehicle operator holding his both hands on a steering wheel depresses by either foot the pedal actuator 116 for simultaneous tilt and telescope operation. The downward movement of the pedal actuator 116 automatically releases tilt lock and telescope lock mechanisms 85 and 131, respectively. In the tilt lock mechanism 85 which is best shown in FIG. 3, the downward movement of the cable 108 causes the bell crank 98 rotation and lifting of the detent pin 96 out of its engagement with the detent plate recess 94. This permits the steering column 12 to tilt or pivot on its legs 18 and 20 about the pivotal axis 127. The tilting operation of the steering column 12 is assisted by the counterbalance springs 90, preventing accidental falling of the steering column on the operator's lap. Upon release of the pedal actuator 116, the detent pin 96 urged by the return spring 102 will immediately latch with the closest recess of the detent plate recesses 94, thereby locking the steering column 12 in a selected position.

The telescope lock mechanism 131 provides ten telescope detent positions. FIG. 4 shows an innermost position of the wheel 14. The pedal actuator 116 moving downwardly pulls the cable 132 attached to the actuator pivot arm 117a. The cable 132 in its turn pulls the lock pin 36 until its annular groove portion 44 is positioned under the quill shaft 30, thereby clearing the path for the shaft 30 and wheel 14 telescoping movement. The steering wheel 14 attached to the quill shaft 30 can move upwardly or downwardly while the pedal actuator 116 is depressed. Upon release of the pedal actuator the spring 40 will urge the lock pin 36 to return to its original locked position, thereby locking the quill shaft 30 to the steering column 12. As is evident from the above description, the pedal actuator 116 connected by cables 108, 132 to both tilt and telescope lock mechanisms releases and locks them simultaneously.

The keyboard 70 non-rotatably mounted on the quill shaft 30 is telescoping and tilting together with the steering wheel 14. The readout instrument panel 78 does not telescope, but tilts simultaneously with the steering wheel 14 and column 12 providing an unobstructed view thereof in all tilt positions.

The subject invention significantly improves visibility and access to the vehicle control and analyses keyboard disposed in the center of the steering wheel. It also improves the view of the readout instrument panel with plurality indicators mounted thereon due to constant angular correlation between the wheel and the instrument panel. Further, it is an advantage to have both hands laid on the steering wheel during the tilt and telescope operation thereof which is accomplished by virtue of a foot operated lock release mechanism. This is particularly convenient for the tractor operation where the operator must utilize a plurality of controls for the tractor and its implements' operation.

The foregoing description and drawings merely illustrate the preferred embodiment and the invention is not limited thereto, except insofar as the appended claims are so limited, and so those skilled in the art who have the disclosure before them will be able to make modifications and variations therein without departing from the scope of the invention.

What is claimed is:

1. A motor vehicle tilt and telescope steering wheel arrangement comprising:
   a steering wheel rotatably mounted on a slanted steering column;
   said steering column comprising tilt means and a tilt lock mechanism therefor;
   said steering column comprising a steering wheel telescope means and a telescope lock mechanism therefor being independent of said tilt lock mechanism;
   a lock release mechanism interconnected with said tilt lock and telescope lock mechanisms for simultaneous disengagement thereof in response to an operator's one-step actuation;
   said telescope means comprising a non-rotatable shaft supporting said wheel being rotatable thereon for turning a steering shaft means via a gear set;
   said steering shaft means connected and operatively engageable with said tilt lock mechanism.

2. The invention according to claim 1, and a control keyboard non-rotatably and detachably mounted on said steering column and within the boundaries of said steering wheel;
   said shafts being noncoaxial and said locks being actuated by respective cables of a cable system linking said lock mechanisms.

3. The invention according to claim 1, and an instrument panel rigidly secured to said steering column and simultaneously tiltable with said steering wheel and said steering column;
   said telescope lock mechanism comprising a sliding lock pin facilitating a linear movement of said non-rotatable shaft therethrough in one position thereof.

4. The invention according to claim 1, and said lock release mechanism comprising a single pedal actuator accessable to either foot;
   said pedal actuator being connected to said tilt lock and telescope lock mechanisms by cables attached to respective ends of said actuator.

5. The invention according to claim 1, and said non-rotatable shaft permitting said steering wheel to freely rotate thereon and being able to reciprocably move therewith;
   said non-rotatable shaft being a quill shaft engageable with said telescope lock mechanism.

6. The invention according to claim 5, and
   a retaining ring mounted on said non-rotatable shaft and preventing further linear displacement thereof.

7. The invention according to claim 5, and said steering shaft means being parallel to and reciprocally displaceable with said quill shaft;
   said steering shaft means including gear at one end thereof meshing with and driven by a steering wheel gear rigidly attached to said steering wheel and mounted on said non-rotatable quill shaft;
   steering torque transmitting means interconnecting another end of said steering shaft means with a vehicle steering system.

8. The invention according to claim 7, and said vehicle steering system comprising a steering pump connected with said another end of said steering shaft by virtue of a universal joint;
   spring loaded lock pins of said lock mechanisms being interconnected by a pulley-cable system.

9. The invention according to claim 1, and said tilt means comprising a steering column frame pivotally mounted on a steering column support base secured to a vehicle body and having at least three tilt positions;
   a pulley-cable system interconnecting said lock mechanisms with a foot pedal.

10. The invention according to claim 9, and said tilt lock mechanism comprising:
    a detent plate with a plurality of notches being attached to said steering column frame;
    a spring loaded bell crank lever pivotally mounted on said steering column support base and including a detent pin at one thereof movable into said notches for a lockable engagement of said steering column frame with said support base; and
    another end of said bell crank being connected with said lock release mechanism.

11. The invention according to claim 1, and said telescope lock mechanism comprising an undulated portion of a quill shaft having a plurality of recesses adopted to receive a spring-loaded lock pin for a lockable engagement, thereby preventing reciprocal displacement of said quill shaft;
    said lock pin movable through and supported by said steering column;
    said lock pin having an annular groove portion clearing said quill shaft travel path in an unlocked position;
    said lock pin being moved into said unlocked position by said lock release mechanism.

12. The invention according to claim 1, and said tilt lock mechanism comprising:
    a detent plate with a plurality of notches being attached to said steering column frame;
    a spring loaded bell crank lever pivotally mounted on said steering column support base and including a detent pin at one thereof movable into said notches for a lockable engagement of said steering column frame with said support base;
    another end of said bell crank being connected with said lock release mechanism;
    said telescope lock mechanism comprising an undulated portion of a quill shaft having a plurality of recesses adopted to receive a spring-loaded lock pin for a lockable engagement, thereby preventing reciprocal displacement of said quill shaft;
    said lock pin movable through and supported by said steering column;
    said lock pin having an annular groove portion clearing said quill shaft travel path in an unlocked position;
    said lock pin being moved into said unlocked position by said lock release mechanism;
    said lock release mechanism comprising a pulley-guided control cable interlocking on side of said pedal actuator with said lock pin of said telescope lock mechanism and another pulley-guided control cable interconnecting another side of said pedal actuator with said bell crank lever of said tilt lock mechanism.

13. The invention according to claim 1 and
    said spring means preventing accidental falling thereof during tilt position change;
    said gear set reciprocably moveable with said non-rotatable shaft.

14. A motor vehicle tilt and telescope steering wheel arrangement comprising:
- a steering wheel rotatably mounted on a slanted steering column;
- said steering column comprising tilt means and a tilt lock mechanism therefor;
- said steering column comprising a steering wheel telescope means and a telescope lock mechanism therefor being independent of said tilt lock mechanism;
- a lock release mechanism interconnected with said tilt lock and telescope lock mechanisms for simultaneous disengagement thereof in response to an operator's one-step actuation;
- said lock release mechanism comprising a pulley-guided control cable interlocking one side of said pedal actuator with a lock pin of said telescope lock mechanism and another pulley-guided control cable interconnecting another side of said pedal actuator with a bell crank lever of said tilt lock mechanism.

15. A motor vehicle tilt-telescope steering arrangement comprising:
- a steering wheel, a steering column frame pivotablly mounted on a vehicle support base, a steering wheel telescope means with a telescope lock mechanism, a steering column tilt means with a telescope lock mechanism; a release mechanism for simultaneous disengagement of said telescope lock and tilt lock mechanisms;
- spring means urging a foot pedal to move into a raised position via separate cables;
- said spring means comprising springs attached to respective lock pins of said tilt and telescope lock mechanisms;
- said release mechanisms comprising cables attached to a bell crank of said tilt lock and a sliding lock pin of said telescope lock.

* * * * *